(12) United States Patent
English et al.

(10) Patent No.: US 8,542,611 B1
(45) Date of Patent: Sep. 24, 2013

(54) WIRELESS COMMUNICATION SYSTEM FOR ROUTING EMERGENCY CALLS FROM A VOIP NETWORK

(75) Inventors: Eric C. English, Lee's Summit, MO (US); Jay Douglas Cole, Overland Park, KS (US); Philip Martin Kunkel, Overland Park, KS (US); Talat Jamshidi, Leawood, KS (US); Wen Xue, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 393 days.

(21) Appl. No.: 12/886,180

(22) Filed: Sep. 20, 2010

(51) Int. Cl.
H04L 12/28 (2006.01)
H04M 11/04 (2006.01)

(52) U.S. Cl.
USPC .......................... 370/254; 370/401; 455/404.2

(58) Field of Classification Search
None
See application file for complete search history.

(56) References Cited

U.S. PATENT DOCUMENTS

| | | | |
|---|---|---|---|
| 6,922,565 B2 | 7/2005 | Rhodes et al. | |
| 6,940,950 B2 | 9/2005 | Dickinson et al. | |
| 7,260,186 B2 | 8/2007 | Zhu et al. | |
| 7,388,490 B2 * | 6/2008 | Freitag et al. | 455/404.1 |
| 7,536,188 B1 * | 5/2009 | Fegan et al. | 370/352 |
| 7,742,578 B1 * | 6/2010 | Klesper et al. | 370/352 |
| 2006/0293024 A1 * | 12/2006 | Benco et al. | 455/404.2 |
| 2007/0003024 A1 | 1/2007 | Olivier et al. | |
| 2007/0058615 A1 * | 3/2007 | Hasenfang et al. | 370/352 |
| 2007/0153984 A1 * | 7/2007 | Bloebaum et al. | 370/395.52 |
| 2007/0153986 A1 * | 7/2007 | Bloebaum et al. | 370/395.52 |
| 2007/0263641 A1 | 11/2007 | Yee | |
| 2008/0045234 A1 * | 2/2008 | Reed | 455/456.1 |
| 2009/0003312 A1 * | 1/2009 | Velazquez et al. | 370/352 |
| 2009/0004999 A1 * | 1/2009 | Zhu et al. | 455/404.2 |
| 2009/0067420 A1 * | 3/2009 | Ganesan et al. | 370/389 |

* cited by examiner

*Primary Examiner* — Gregory Sefcheck
*Assistant Examiner* — Joshua Smith (57) ABSTRACT

Embodiments disclosed herein provide systems and methods for providing Voice over Internet Protocol (VoIP) emergency calls via a wireless communication network. In a particular embodiment, a method provides receiving an emergency call request from a VoIP communication network initiated by a VoIP communication client operating on the VoIP communication network. The method further provides processing the emergency call request to determine a wireless device associated with the VoIP communication client. The method further provides determining a location of the wireless device and determining a public safety answering point (PSAP) based on the location of the wireless device. The method further provides establishing an emergency call between the VoIP communication client and the PSAP via the wireless communication system and the VoIP communication network based on the location of the wireless device.

16 Claims, 8 Drawing Sheets

WIRELESS COMMUNICATION SYSTEM FOR ROUTING EMERGENCY CALLS FROM A VOIP NETWORK

TECHNICAL BACKGROUND

A telephone operating on traditional circuit switched telephone networks is tied to the location where the telephone connects to the network. That location is usually tied to a telephone number that can be used to connect with whatever phone is connected at the location associated with the telephone number. Likewise, a call placed from a telephone at that location may be traced back to the location. However, in some modern voice communication networks, such as a Voice over Internet Protocol (VoIP) network, clients that operate on the VoIP network, such as a VoIP telephone or other device, may connect to the VoIP network from almost anywhere. A VoIP client may be identified to the VoIP network based on the identification credentials of the VoIP client itself rather than the location where the VoIP client connects to the VoIP network. Therefore, it may be difficult to determine a location for a VoIP client that places a call.

Emergency calls, such as 911 calls, may require a location for an emergency caller. The location of the emergency caller allows for the emergency call to be routed to a public safety answering point (PSAP) that services the location of the caller. The PSAP servicing the location of the emergency caller allows for nearby emergency services, such as police, fire, and ambulance, to be dispatched to the location. Thus, if a location for a VoIP client that initiates an emergency call cannot be determined, then the call may not be routed to an appropriate PSAP for local emergency services.

OVERVIEW

Embodiments disclosed herein provide systems and methods for providing Voice over Internet Protocol (VoIP) emergency calls via a wireless communication network. In a particular embodiment, a method provides receiving an emergency call request from a VoIP communication network initiated by a VoIP communication client operating on the VoIP communication network. The method further provides processing the emergency call request to determine a wireless device associated with the VoIP communication client. The method further provides determining a location of the wireless device and determining a public safety answering point (PSAP) based on the location of the wireless device. The method further provides establishing an emergency call between the VoIP communication client and the PSAP via the wireless communication system and the VoIP communication network based on the location of the wireless device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
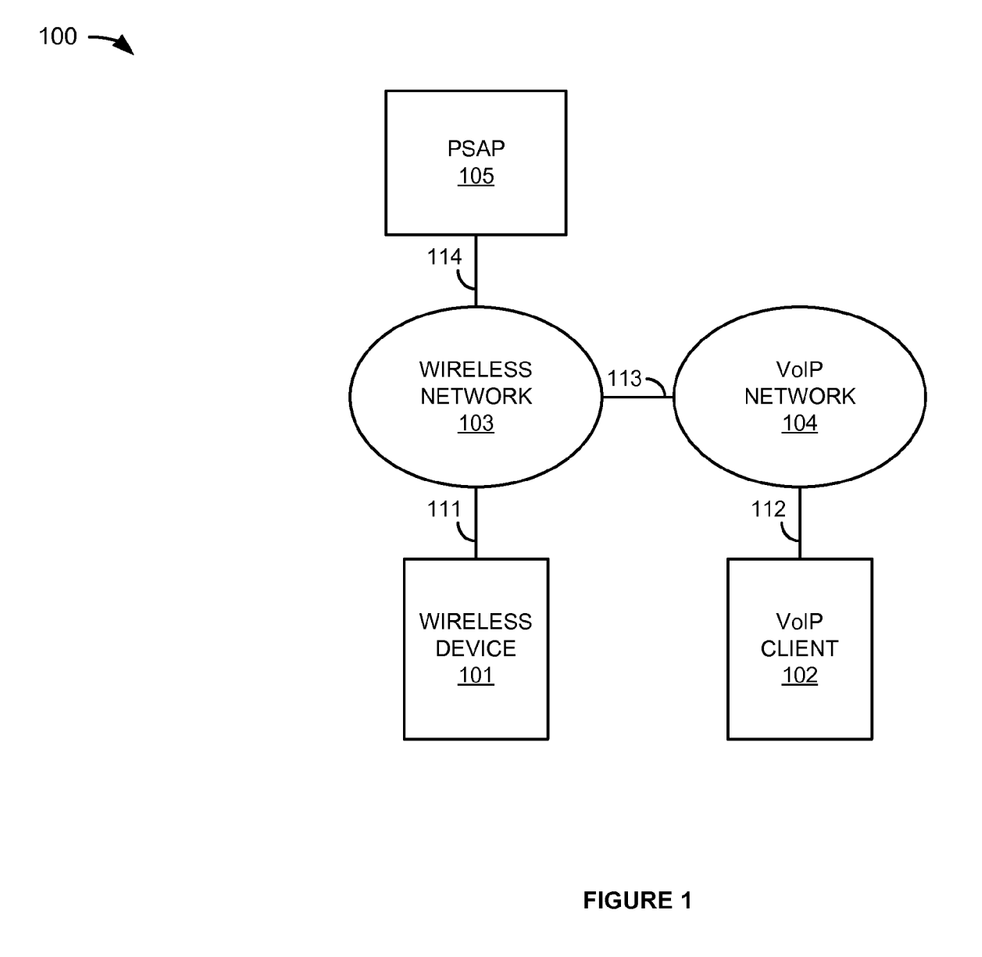
FIG. 1 illustrates a wireless communication system.

FIG. 1 illustrates wireless communication system 100. Wireless communication system 100 includes wireless communication device 101, Voice over Internet Protocol (VoIP) client 102, wireless communication network 103, VoIP communication network 104, and public safety answering point (PSAP) 105. Wireless communication device 101 and wireless network 103 communicate over wireless link 111. VoIP client 102 and VoIP network 104 communicate over communication link 112. Wireless network 103 and VoIP network 104 communicate over communication link 113. Wireless network 103 and PSAP 105 communicate over communication link 114.

In operation, VoIP client 102 is capable of communicating with other VoIP clients over VoIP network 104. VoIP client 102 may also be able to communicate with traditional telephones or cellular phones through VoIP network in conjunction with other communication networks such as wireless network 103. In certain situations VoIP client 102 may place an emergency call to an emergency service, such as 911. The emergency call service may be provided in a PSAP, such as PSAP 105.

PSAPs each serve a defined geographic area so that emergency services closest in proximity to an emergency caller may be dispatched if necessary. Traditional fixed landline telephones have a fixed determinable location, thus, the appropriate PSAP for an emergency call from a landline telephone can easily be determined. However, VoIP telephone services use a packet network connection, such as a traditional Internet connection, to provide voice services over a VoIP communication network. This feature allows clients that operate on a VoIP network to operate almost anywhere that the client may connect to a packet network. This ability makes it difficult to determine a location for the VoIP client in order to route an emergency call to an appropriate PSAP.

Figure 2:
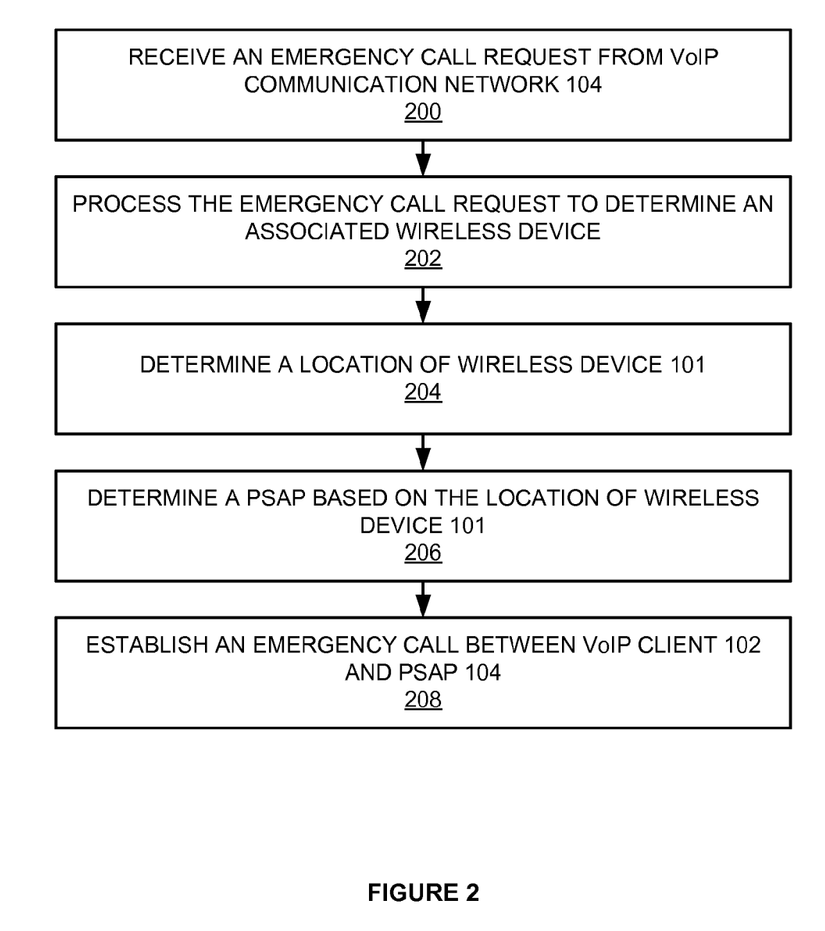
FIG. 2 illustrates the operation of a wireless communication system.

FIG. 2 illustrates the operation of wireless communication system 100. Wireless network 103 receives an emergency call request from VoIP network 104 initiated by VoIP client 102 operating on VoIP network 103 (step 200). The emergency call request may be in the form of a Session Initiation Protocol (SIP) request. VoIP client 102 may be a dedicated VoIP telephone, a software client on a laptop, a software client on a mobile device, such as a wireless device 101, or any other device that is capable of connecting to VoIP network 104. VoIP client 102 may communicate with VoIP network 104 through the Internet via an Internet connection, such as a Digital Subscriber Line (DSL) or cable modem. A user of VoIP client 102 may indicate that VoIP client 102 should initiate the emergency call by dialing an emergency phone number, such as 911, into VoIP client 102 or may otherwise indicate to VoIP client 102 that an emergency call should be initiated.

Upon receiving the emergency call request from VoIP client 102, VoIP network 104 may determine that wireless network 103 is associated with VoIP client 102. VoIP network 104 may make the determination based on a prior notification from the user of VoIP client 102 that the user of VoIP client 102 is associated with wireless network 103. The user of VoIP client 102 may be associated with wireless network 103 if the user of VoIP client 102 is also a user of wireless device 101 and wireless device 101 operates on wireless network 103. Thus, the user may be a customer of both VoIP network 104 and wireless network 103. Instead of attempting to connect the emergency call to a PSAP itself, VoIP network 104 transmits the emergency call request to wireless network 103 so that wireless network 103 may connect the call with the appropriate PSAP. The emergency call request transferred from VoIP network 104 may be a forward of the emergency call request from VoIP client 102 or VoIP network 104 may create a new emergency call request on behalf of VoIP client 102.

Wireless network 103 processes the emergency call request to determine a wireless device associated with the VoIP client 102 (step 202). In this example, wireless network 103 determines that wireless device 101 is associated with VoIP client 102. Wireless network 103 may make the determination from information included in the emergency call request, such as an identifier for VoIP client 102, phone number for wireless device 101, or any other information that wireless network 103 may use to associate wireless device 101 with VoIP client 102. For example, the emergency call request may include an identifier for VoIP client 102, such as a SIP address, which wireless network 103 is able to associate with wireless device 101.

Wireless network 103 then determines a location of wireless device 101 (step 204). The location may be determined in various ways such as global positioning system (GPS) coordinates from wireless device 101, the location of the base station to which wireless device is connected, or any other way of determining a location of wireless device 101. The location may be specific, such as GPS coordinates, or may be more general, such as a city or region. The location should be a location that may be associated with a public safety answering point (PSAP) for the location. Once the location of wireless device 101 is determined, wireless network 103 determines a PSAP based on the location of wireless device 101 (step 206). In this example, wireless network 103 determines that PSAP 105 is the PSAP that services the location of wireless device 101.

After determining that PSAP 105 is the appropriate PSAP for the location of wireless device 101, wireless network 103 establishes an emergency call between the VoIP client 102 and PSAP 105 via wireless network 103 and VoIP network 104 (step 208). Thus, wireless network 103 determines the correct PSAP for which the emergency call should be routed and VoIP network 104 does not need to determine the location of VoIP client 102 in order to route the emergency call.

In some embodiments, wireless network 103 may transfer a phone number for wireless device 101 to PSAP 105. Wireless network 103 may also transfer an identifier for VoIP client 102, such as a phone number or SIP address for VoIP client 102. If the emergency call established between VoIP client 102 and PSAP 105 disconnects, then PSAP 105 can call back wireless device 101 or VoIP client 102 to continue emergency call services. For example, VoIP client 102 may be running on a laptop, if the laptop loses a connection to the Internet, then the emergency call may be dropped. PSAP 105 could then call back wireless device 101 to continue emergency call service with the user. Therefore, while the emergency call was established using VoIP client 102, the call is reestablished using wireless device 101 over the traditional cellular network.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

VoIP communication client 102 comprises a computer system and communication circuitry. The computer system comprises software modules executed by a processing system allowing VoIP client 102 to communicate over VoIP network 104. The communication circuitry comprises circuitry that allows VoIP client 102 to communicate with VoIP network 104. VoIP client 102 may be a VoIP telephone, computer, wireless telephone, mobile Internet appliance, wireless network interface card, media player, game console, or any other type of VoIP communication apparatus. In some embodiments, VoIP client 102 may be integrated into wireless device 101.

Wireless communication network 103 is a communication network that comprises telephony switches, wireless access nodes, Internet routers, network gateways, computer systems, communication links, or some other type of communication equipment—including combinations thereof.

VoIP communication network 104 is a communication network that comprises telephony switches, Internet routers, network gateways, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-114 use metal, glass, air, space, or some other material as the transport media. Communication links 112-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-114 could be direct links or may include intermediate networks, systems, or devices.

Figure 3:
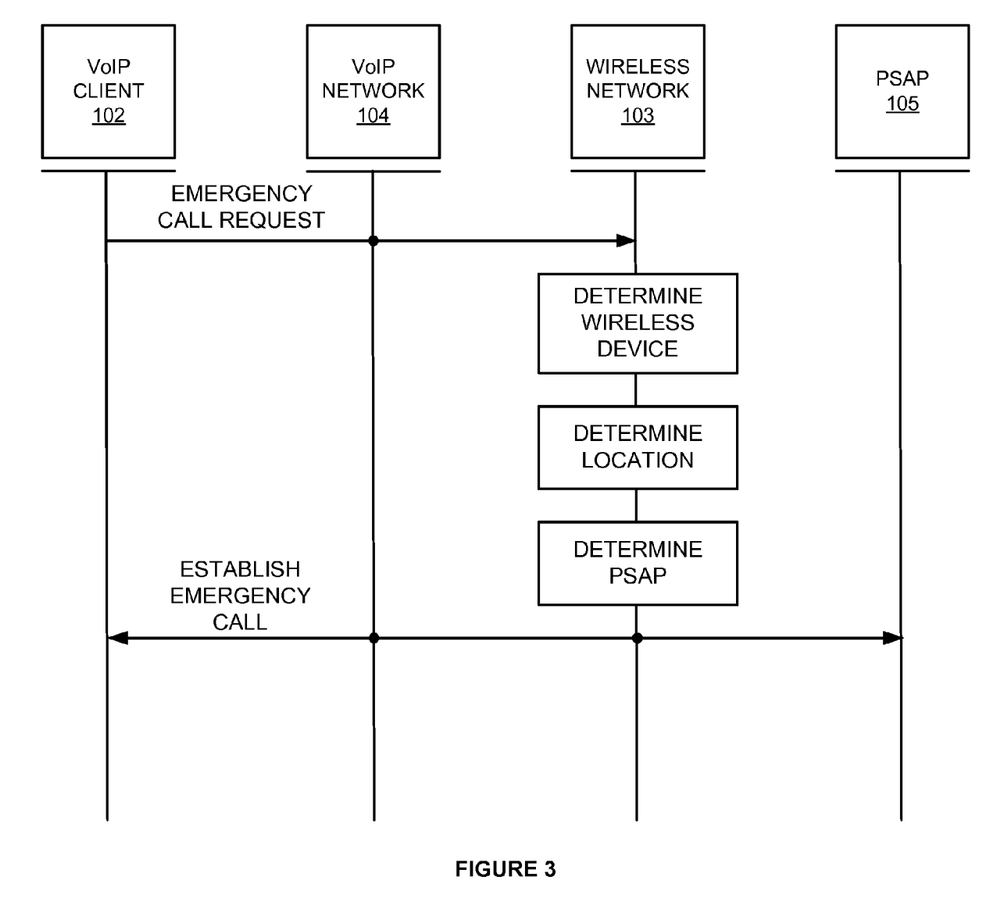
FIG. 3 illustrates the operation of a wireless communication system.

FIG. 3 is a sequence diagram illustrating the operation of wireless communication system 100. The sequence begins when VoIP client 102 initiates an emergency call by transferring an emergency call request to VoIP network 104. The call may be initiated by a user dialing 911 into VoIP client 102, pressing an emergency call button, or some other way that the user could indicate that an emergency call should be placed. VoIP network 104 determines that wireless network 103 is associated with VoIP client 102 and the emergency call request is forwarded on to wireless network 103. The emergency call request may be forwarded in the form that the request was received at VoIP network 104, may be modified to contain additional information about VoIP client 102, or a new emergency call request may be generated by VoIP network 104.

Wireless network 103 processes the emergency call request to determine that wireless device 101 is associated with the emergency call request from VoIP network 104. Wireless network 103 may make the determination based on information contained in the received emergency call request, such as the phone number for wireless device 101 or an identifier for VoIP client 102. After determining that the emergency call is associated with wireless device 101, wireless network 103 determines a location for wireless device 101. In this example, wireless network 103 may recognize the access node with which wireless device 101 is connected then use the area serviced by that access node as the location of wireless device 101.

Wireless network 103 then determines an appropriate PSAP based on the location of wireless device 101. In this example, wireless network 103 determines that the appropriate PSAP is PSAP 105 that services the area covered by the access node to which wireless device 101 is connected. Wireless network 103 then establishes an emergency call to PSAP 105. The emergency call is routed between VoIP client 102 and PSAP 105 through VoIP network 104 and wireless network 103. Therefore, while VoIP network 104 is still in the call path, VoIP network 104 uses wireless network 103 to determine the appropriate PSAP and connect the emergency call.

Figure 4:
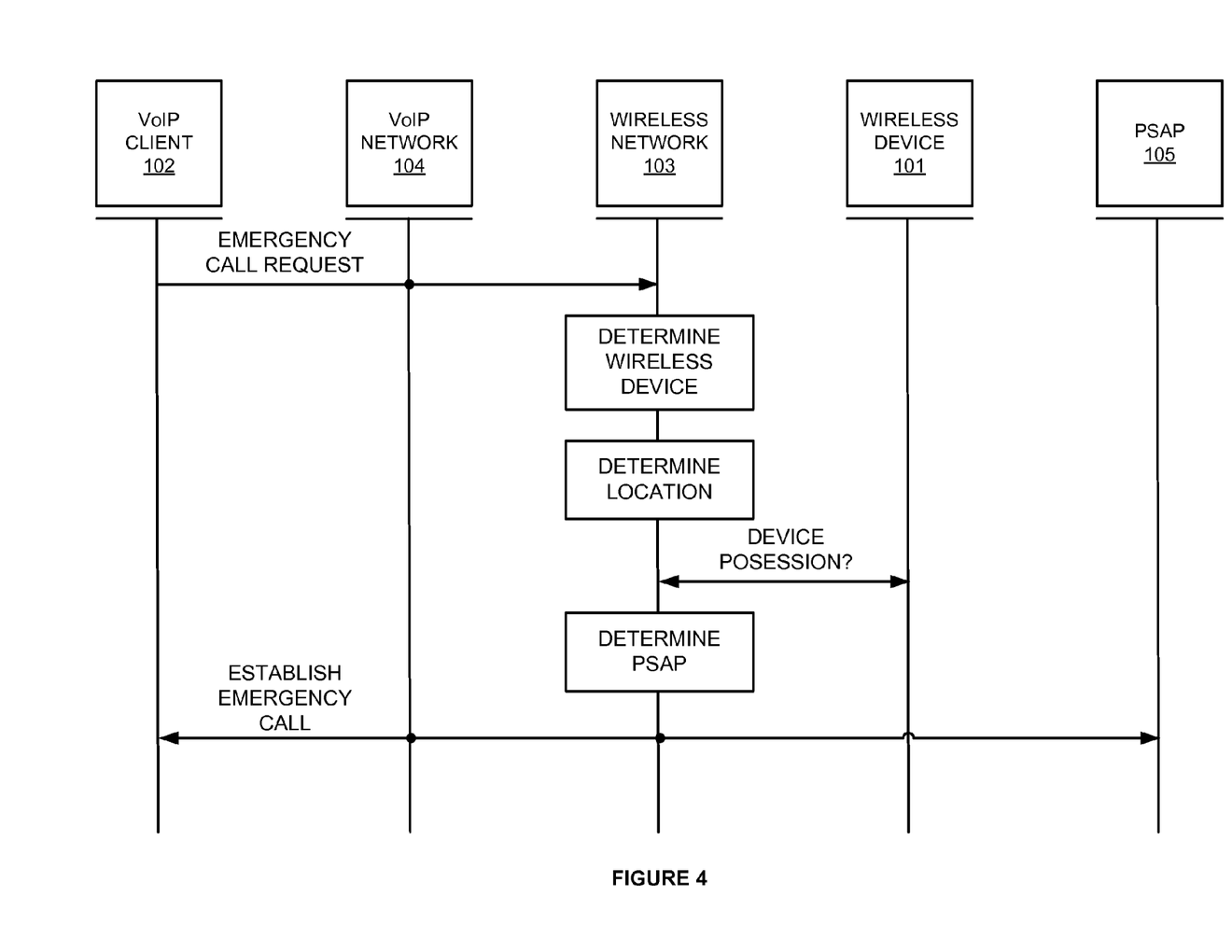
FIG. 4 illustrates the operation of a wireless communication system.

FIG. 4 is a sequence diagram illustrating the operation of wireless communication system 100. The sequence begins when VoIP client 102 initiates an emergency call by transferring an emergency call request to VoIP network 104. The call may be initiated by a user dialing 911 into VoIP client 102, pressing an emergency call button, or some other way that the user could indicate that an emergency call should be placed. VoIP network 104 determines that wireless network 103 is associated with VoIP client 102 and the emergency call request is forwarded on to wireless network 103. The emergency call request may be forwarded in the form the request was received at VoIP network 104, may be modified to contain additional information about VoIP client 102, or a new emergency call request may be generated by VoIP network 104.

Wireless network 103 processes the emergency call request to determine that wireless device 101 is associated with the emergency call request from VoIP network 104. Wireless network 103 may make the determination based on information contained in the received emergency call request, such as the phone number for wireless device 101 or an identifier for VoIP client 102. After determining that the emergency call is associated with wireless device 101, wireless network 103 determines a location for wireless device 101. In this example, wireless network 103 may request that wireless device 101 transfer the current GPS coordinates of wireless device 101 to wireless network 103 in order to determine a location of wireless device 101.

Wireless network 103 then sends a message to wireless device 101 to determine whether the user of VoIP client 102 is in possession of wireless device 101. The message may be a text message or any other type of message to wireless device 101 that may cause a prompt to a user of wireless device 101. If the user of VoIP client 102 that placed the emergency call is also in possession of wireless device 101, then the user may indicate that the user is in possession of wireless device 101 in response to the message from wireless network 103. For example, the user may transfer a responding text message indicating that the user is or is not in possession, or wireless device 101 may receive a user input in response to a prompt inquiring as to whether the user is in possession of wireless device 101 then transfer a message to wireless network 103 notifying wireless network 103 of the indication.

If wireless network 103 receives an indication that the user is in possession of wireless device 101, the wireless network 103 determines an appropriate PSAP based on the location of wireless device 101. In this example, wireless network 103 determines that the appropriate PSAP is PSAP 105 that services the area where the received GPS coordinates indicate wireless device 101 is located. Wireless network 103 then establishes an emergency call to PSAP 105. The emergency call is routed between VoIP client 102 and PSAP 105 through VoIP network 104 and wireless network 103. Therefore, while VoIP network 104 is still in the call path, VoIP network 104 uses wireless network 103 to determine the appropriate PSAP and connect the emergency call.

If wireless network 103 receives an indication that the user is not in possession or receives no indication in response to the message query transmitted by wireless network 103, then wireless network 103 may use a default location for VoIP client 102. The default location may be the home of the user of VoIP client 102, a city where the user lives, determined from the network address of VoIP client 102, or any other location that may be set as a default location for VoIP client 102. Alternatively, wireless network 103 may determine a probability that the user is in possession of wireless device 101. The probability may be determined based on recent use of wireless device 101, recent movement of wireless device 101, a usage history for wireless device 101, or any other way of determining whether wireless device 101 is in possession of a user. If wireless network 103 determines that the probability that the user is in possession of wireless device 101 is above a threshold, then the location of wireless device 101 may be used. If the probability falls below the threshold, then a default location may be used. Whichever location is used, wireless network 103 selects an appropriate PSAP for that location and establishes an emergency call between VoIP client 102 and PSAP 105 through VoIP network 104 and wireless network 103.

In some embodiments, wireless device 101 may not transfer a message to wireless device 101 to determine whether a user is in possession of wireless device 101. In those embodiments, wireless device 101 may instead proceed directly to determining the probability that a user is in possession of wireless device 101, as described above.

Figure 5:
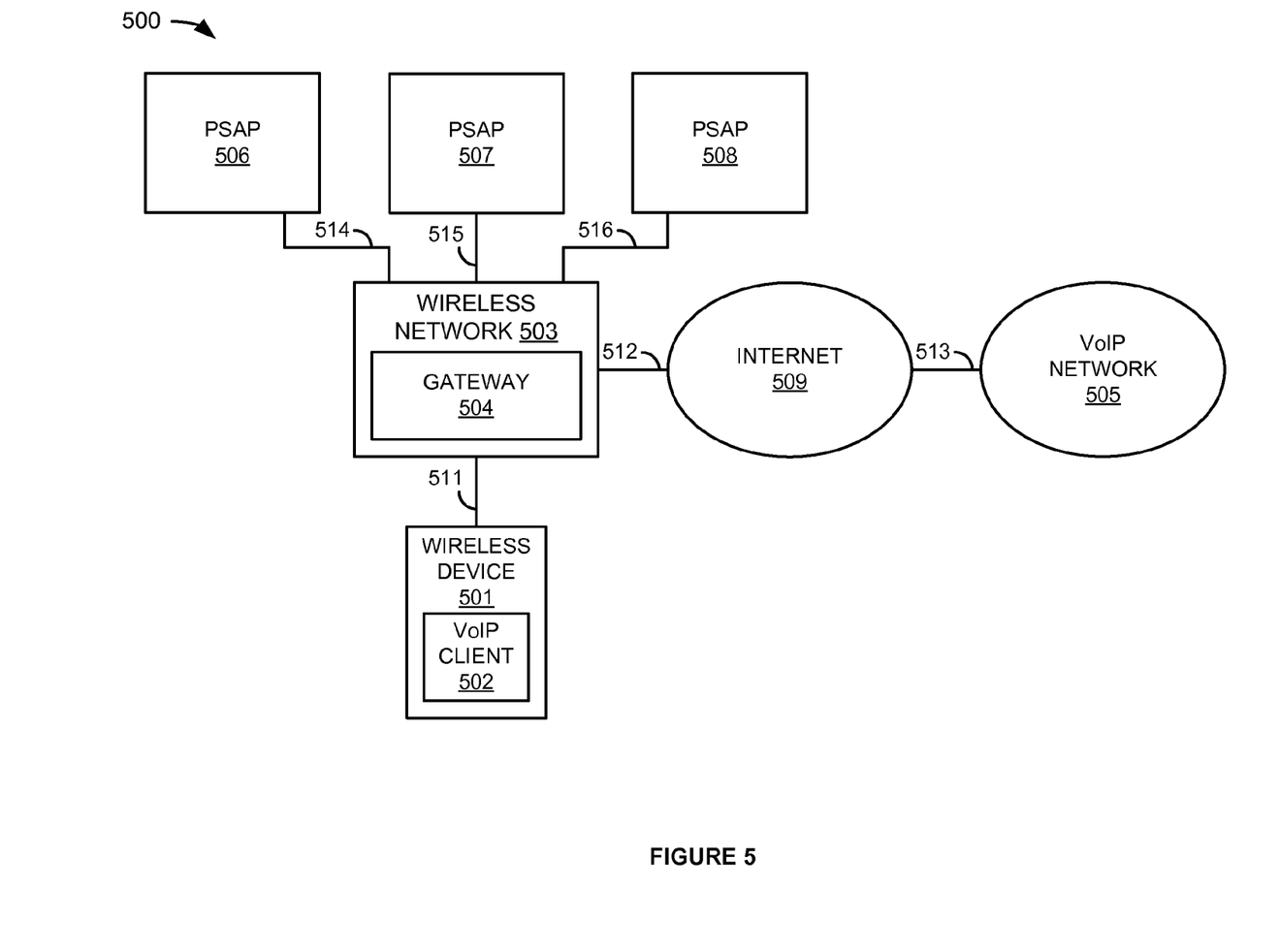
FIG. 5 illustrates a wireless communication system.

FIG. 5 illustrates wireless communication system 500. Wireless communication system 500 includes wireless communication device 501, VoIP client 502, wireless communication network 503, communication gateway 504, VoIP communication network 505, PSAPs 506-508, and Internet 509. Wireless device 501 and wireless network 503 communicate over wireless link 511. Wireless network 503 and Internet 509 communicate over communication link 512. Internet 509 and VoIP network 505 communicate over communication link 513. Wireless network 503 and PSAP 506 communicate over communication link 514. Wireless network 503 and PSAP 507 communicate over communication link 515. Wireless network 503 and PSAP 508 communicate over communication link 516.

In operation, wireless device 501 is capable of executing software modules, such as applications, that a user may interact with to accomplish a variety of tasks. One of those applications may be a VoIP client software application, such as VoIP client 502, capable of connecting to and communicating with VoIP network 505. Therefore, as shown in FIG. 5, VoIP client 502 running on wireless device 501 uses wireless network 503 to connect to Internet 509 in order to communicate over VoIP network 505. Wireless network 503 may not need to be aware that VoIP client 502 is running on wireless device 501, as opposed to another device, in order to operate as disclosed herein. In alternative embodiments VoIP network 505 may be an overlay on Internet 509 instead of a separate network as shown in FIG. 5.

Figure 6:
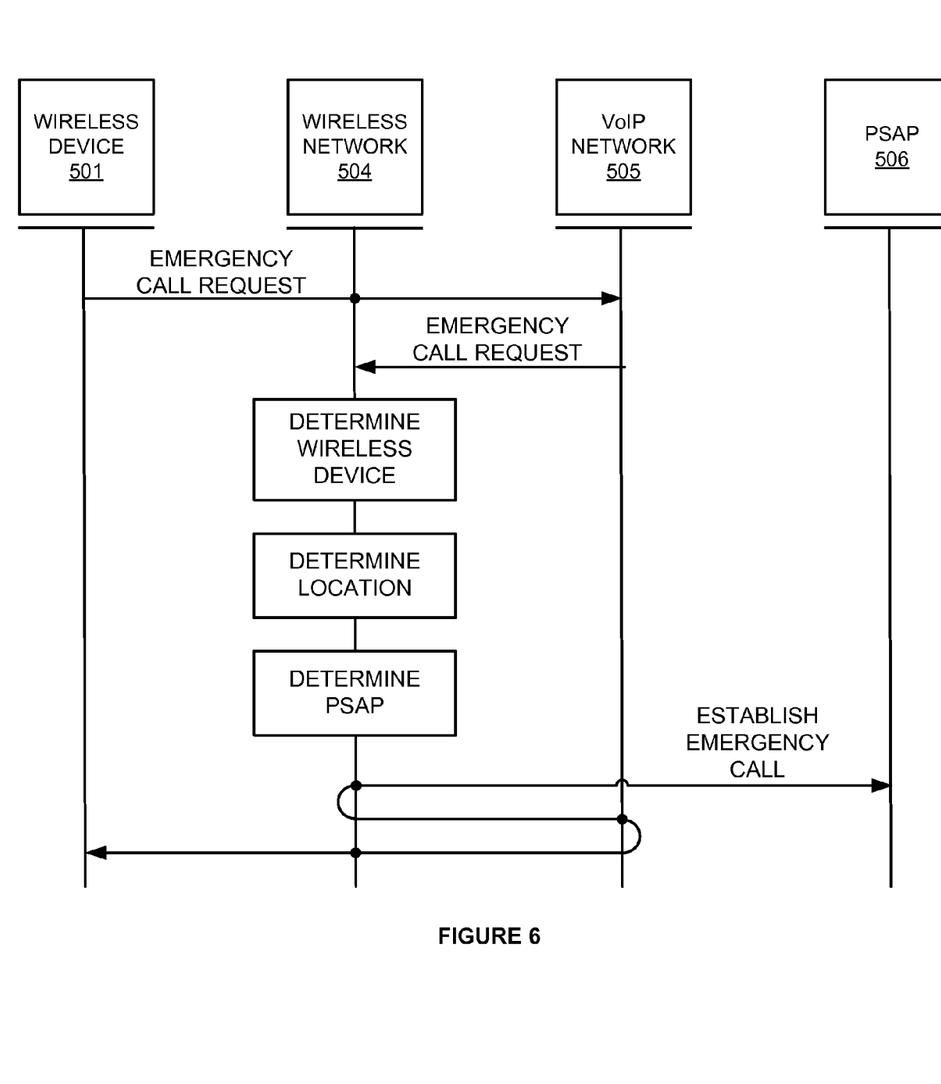
FIG. 6 illustrates the operation of a wireless communication system.

FIG. 6 is a sequence diagram illustrating the operation of wireless communication system 500. The sequence begins with the user of wireless device 501 indicating that the user would like to place an emergency call using VoIP client 502. VoIP client 502 thereby initiates an emergency call by transferring an emergency call request to VoIP network 505. The emergency call request travels through wireless network 503 and Internet 509 to VoIP network 505. Wireless network 503 does not recognize the emergency call request at this point because the request is merely application data for VoIP client 502.

Upon receiving emergency call request, VoIP network 505 determines that VoIP client 502 is associated with wireless network 503. Hence, VoIP network 505 forwards the emergency call request to on to gateway 504 in wireless network 503. The emergency call request may be forwarded in the form the request was received at VoIP network 505, may be modified to contain additional information about VoIP client 502, or a new emergency call request may be generated by VoIP network 505.

Gateway 504 processes the emergency call request to determine that wireless device 501 is associated with the emergency call request from VoIP network 505. Gateway 504 may make the determination based on information contained in the received emergency call request, such as the phone number for wireless device 501 or an identifier for VoIP client 502. After determining that the emergency call is associated with wireless device 501, gateway 504 determines a location for wireless device 501. To determine the location of wireless device 501 gateway 504 may request that wireless device 501 transfer the current GPS coordinates of wireless device 501 to gateway 504 in order to determine a location of wireless device 501, gateway 504 may know the current access node with which wireless device 501 is communicating, gateway 504 may query other systems on wireless network 503, or any other way by which gateway 504 may determine a location of wireless device 501.

Gateway 504 then determines an appropriate PSAP based on the location of wireless device 501. In this example, gateway 504 determines that the appropriate PSAP of PSAPs 506-508 is PSAP 506 that services the area where wireless device 501 is located. Gateway 504 then establishes an emergency call to PSAP 506. The emergency call is routed via VoIP from VoIP client 502 on wireless device 501 through the wireless data connection provided by wireless network 503 to VoIP network 505. The call is then routed through gateway 504 to PSAP 506. Therefore, the user still uses VoIP client 502 to place the emergency call but wireless network 503 connects the call to PSAP 506.

Figure 7:
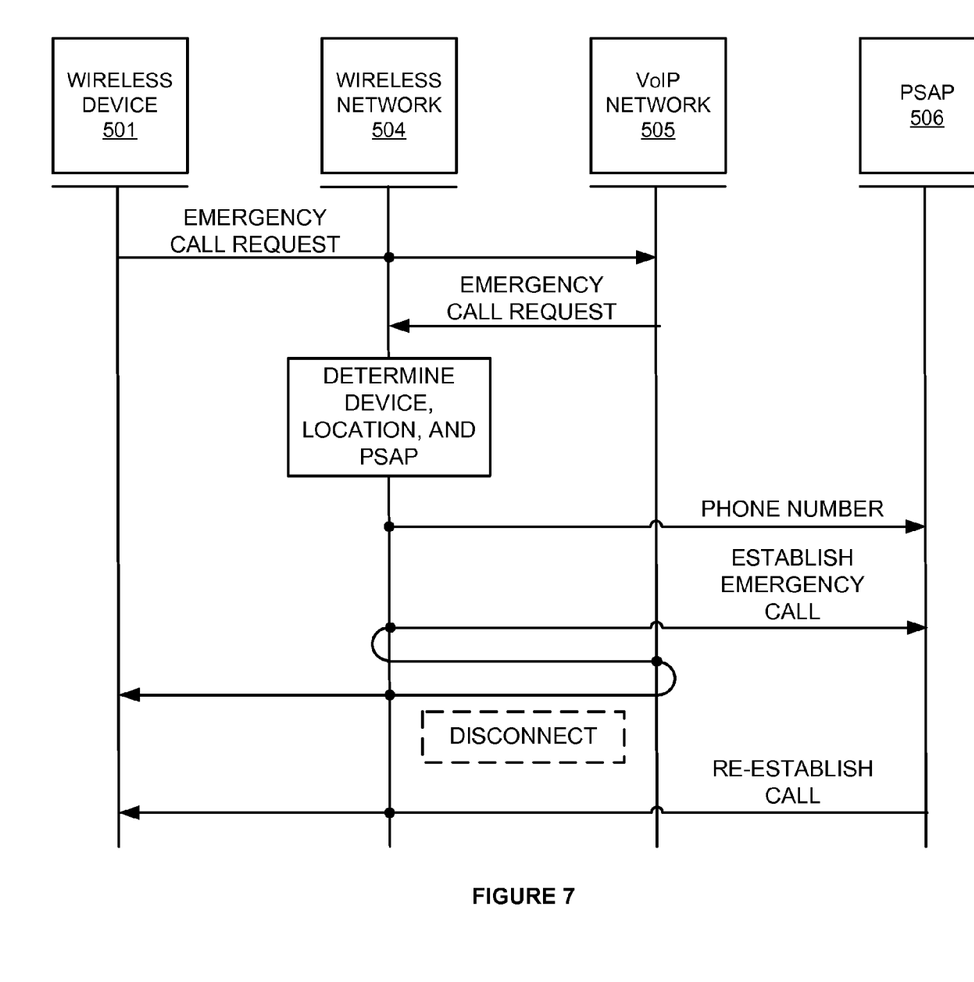
FIG. 7 illustrates the operation of a wireless communication system.

FIG. 7 is a sequence diagram illustrating the operation of wireless communication system 500. The sequence begins with the user of wireless device 501 indicating that the user would like to place an emergency call using VoIP client 502. VoIP client 502 thereby initiates an emergency call by transferring an emergency call request to VoIP network 505. The emergency call request travels through wireless network 503 and Internet 509 to VoIP network 505. Wireless network 503 does not recognize the emergency call request at this point because the request is merely application data for VoIP client 502.

Upon receiving emergency call request, VoIP network 505 determines that VoIP client 502 is associated with wireless network 503. Hence, VoIP network 505 forwards the emergency call request to on to gateway 504 in wireless network 503. The emergency call request may be forwarded in the form it was received at VoIP network 505, may be modified to contain additional information about VoIP client 502, or a new emergency call request may be generated by VoIP network 505.

Gateway 504 processes the emergency call request to determine that wireless device 501 is associated with the emergency call request from VoIP network 505. Gateway 504 may make the determination based on information contained in the received emergency call request, such as the phone number for wireless device 501 or an identifier for VoIP client 502. After determining that the emergency call is associated with wireless device 501, gateway 504 determines a location for wireless device 501. To determine the location of wireless device 501 gateway 504 may request that wireless device 501 transfer the current GPS coordinates of wireless device 501 to gateway 504 in order to determine a location of wireless device 501, gateway 504 may know the current access node with which wireless device 501 is communicating, gateway 504 may query other systems on wireless network 503, or any other way by which gateway 504 may determine a location of wireless device 501.

Gateway 504 then determines an appropriate PSAP based on the location of wireless device 101. In this example, gateway 504 determines that the appropriate PSAP of PSAPs 506-508 is PSAP 506 that services the area where wireless device 501 is located. Gateway 504 then establishes an emergency call to PSAP 506 and transfers a call back number for wireless device 501 to PSAP 506. The emergency call is routed via VoIP from VoIP client 502 on wireless device 501 through the wireless data connection provided by wireless network 503 to VoIP network 505. The call is then routed through gateway 504 to PSAP 506.

At a point in time after the call is established, the connection between VoIP client 502 and PSAP 506 is disconnected. The disconnection may be caused by a problem with any point in the communication path, an inadvertent hang up, or any other reason that may cause VoIP call from client 502 to be disconnected. Upon being disconnected, PSAP 506 uses the phone number of wireless device 501 to call back wireless device 501 to continue the emergency call session. The call back uses wireless network 501 to call wireless device 501 without using VoIP client 502. Thus, while the original emergency call was established using VoIP, the call back uses the traditional cellular call path. Alternatively, PSAP 506 may receive a number or identifier for VoIP client 502 from gateway 504 and may attempt to reestablish the emergency call over the original VoIP path to VoIP client 502.

Figure 8:
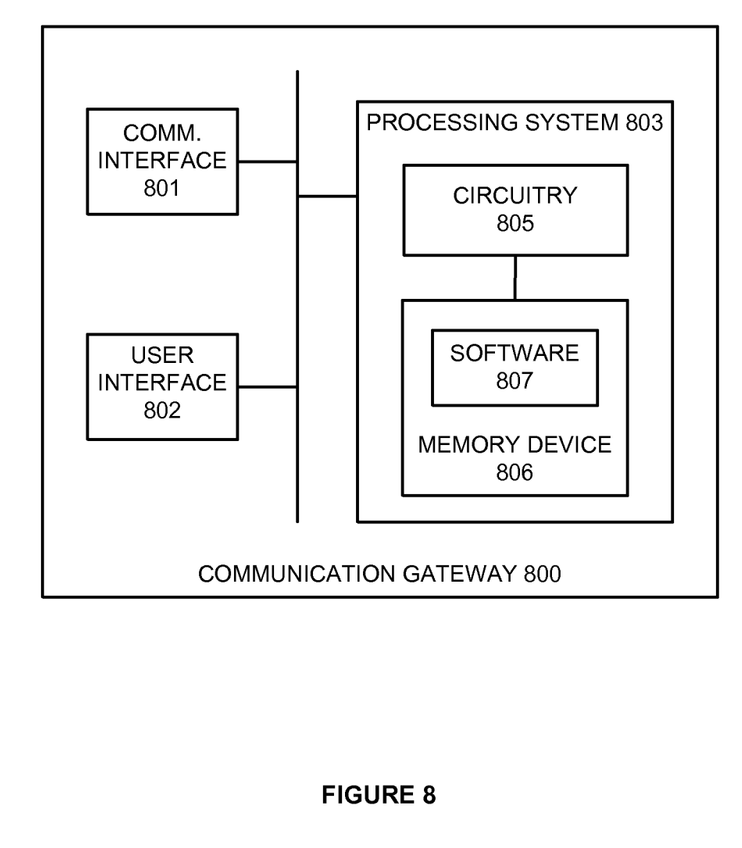
FIG. 8 illustrates a communication gateway.

FIG. 8 illustrates communication gateway 800. Communication gateway 800 is an example of communication gateway 504, although gateway 504 may use alternative configurations. Communication gateway 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a disk drive, flash drive, data storage circuitry, or some other memory apparatus. Operating software 807 comprises computer programs, firmware, or some other form of machine-readable processing instructions. Operating software 807 may include an operating system, utilities, drivers, network interfaces, applications, or some other type of software. When executed by circuitry 805, operating software 807 directs processing system 803 to operate communication gateway 800 as described herein.

In particular, communication interface 801 receives an emergency call request from a Voice over Internet Protocol (VoIP) communication network initiated by a VoIP communication client operating on a VoIP communication network. A software module of operating software 807 directs processing system 803 to process the emergency call request to determine a wireless device associated with the VoIP communication client. Another software module directs processing system 803 to determine a location of the wireless device. A further software module directs processing system 803 to determine a public safety answering point (PSAP) based on the location of the wireless device. Communication interface 801 then establishes an emergency call between the VoIP communication client and the PSAP via the wireless communication system and the VoIP communication network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   receiving an emergency call request from a Voice over Internet Protocol (VoIP) communication network initiated by a VoIP communication client operating on the VoIP communication network;
   processing the emergency call request to determine a wireless device associated with the VoIP communication client;
   transferring a message to the wireless device requesting confirmation that a user associated with a emergency call is in possession of the wireless communication device;
      in response to receiving the confirmation that the user is in possession of the wireless device, determining a location of the wireless device and determining a public safety answering point (PSAP) based on the location of the wireless device;
      if the confirmation is not received, then determining a probability that the user associated with the emergency call is in possession of the wireless device;
         if the probability is above a threshold, then determining the location of the wireless device and determining the PSAP based on the location of the wireless device;
         if the probability is below the threshold, then determining the PSAP based on a default location; and
   establishing the emergency call between the VoIP communication client and the PSAP via the wireless communication system and the VoIP communication network.

2. The method of claim 1 further comprising transferring a phone number for the wireless device to the PSAP.

3. The method of claim 2 wherein the PSAP initiates a call to the phone number if the emergency call connection with the VoIP communication client is interrupted.

4. The method of claim 1 further comprising re-establishing the emergency call between the PSAP and the wireless device if the emergency call connection with the VoIP communication client is interrupted.

5. The method of claim 1 wherein the message is a text message.

6. The method of claim 1 wherein the default location is a default address associated with the VoIP communication client.

7. The method of claim 1 wherein the default location is determined based on the network address of the VoIP communication client.

8. The method of claim 1 wherein the emergency call request is a Session Initiation Protocol (SIP) request.

9. A communication gateway system in a wireless communication system comprising:
   a communication interface configured to receive an emergency call request from a Voice over Internet Protocol (VoIP) communication network initiated by a VoIP communication client operating on the VoIP communication network;
   a processing system configured to process the emergency call request to determine a wireless device associated with the VoIP communication client;
   the communication interface configured to transfer a message to the associated wireless device requesting confirmation that a user associated with an emergency call is in possession of the wireless device and receive a response from the wireless device confirming that the user is in possession of the wireless communication device;
   if the confirmation that the user is in possession of the wireless device is received, then the processing system is configured to determine a location of the wireless device, and determine a public safety answering point (PSAP) based on the location of the wireless device;
   if the confirmation is not received, then the processing system is configured to determine a probability that the user associated with the emergency call is in possession of the wireless communication device, and if the probability is below a threshold then, the processing system is configured to determine the PSAP based on a default location; and
   the communication interface further configured to establish the emergency call between the VoIP communication client and the PSAP via the wireless communication system and the VoIP communication network.

10. The system of claim 9 wherein the communication interface is further configured to transfer a phone number for the wireless device to the PSAP.

11. The system of claim 10 wherein the PSAP initiates a call to the phone number if the emergency call connection with the VoIP communication client is interrupted.

12. The system of claim 9 wherein the communication interface is further configured to re-establish the emergency call between the PSAP and the wireless device if the emergency call connection with the VoIP communication client is interrupted.

13. The system of claim 9 wherein the message is a text message.

14. The system of claim 9 wherein the default location is a default address associated with the VoIP communication client.

15. The system of claim 9 wherein the default location is determined based on the network address of the VoIP communication client.

16. The system of claim 9 wherein the emergency call request is a Session Initiation Protocol (SIP) request.

\* \* \* \* \*